Patented Dec. 11, 1945

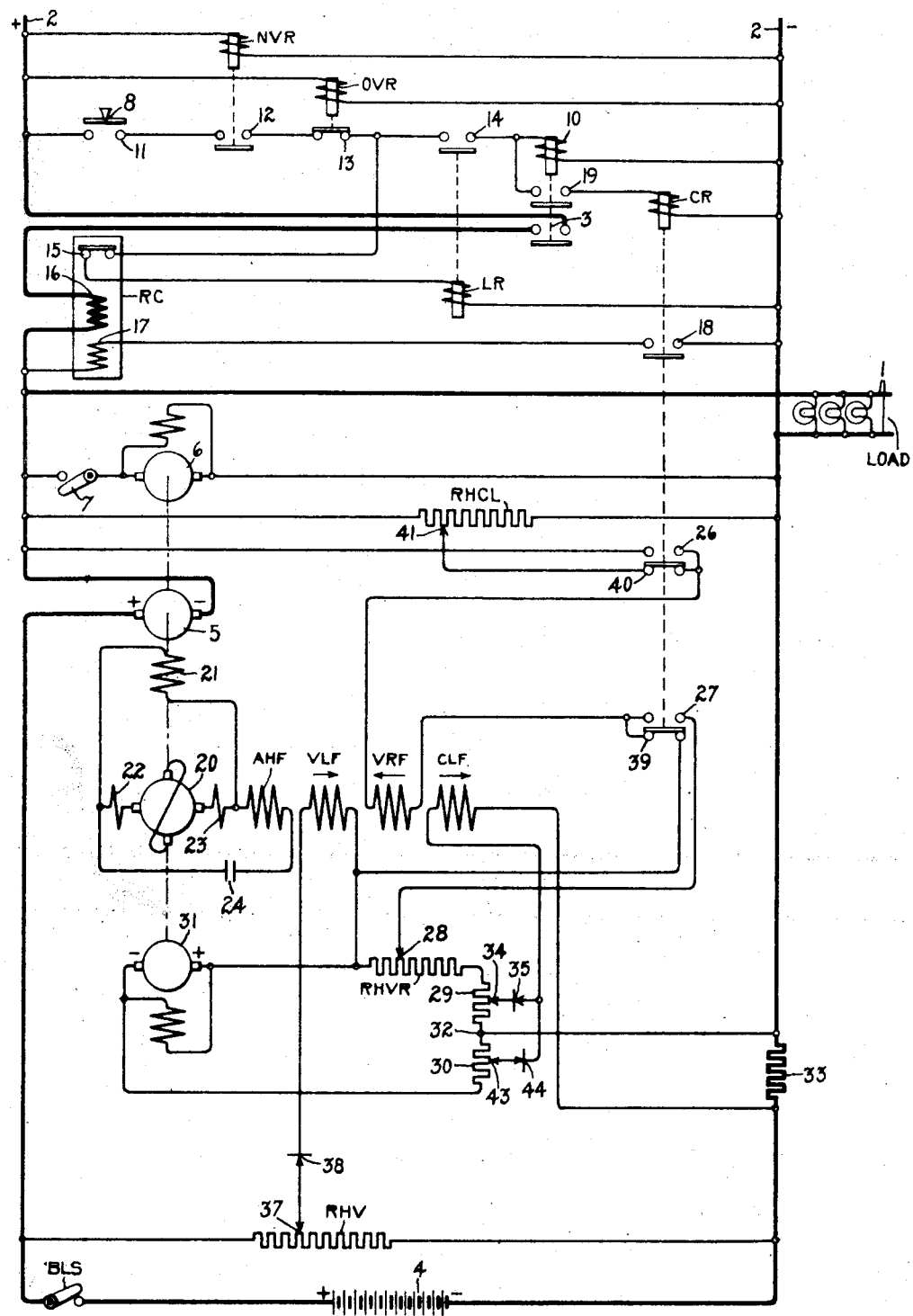

2,390,818

UNITED STATES PATENT OFFICE 2,390,818

REGULATING SYSTEM FOR STORAGE BATTERIES

Burr S. Weaver, Scotia, and Donald E. Garr, Schenectady, N. Y., assignor to General Electric Company, a corporation of New York Application January 21, 1944, Serial No. 519,156

14 Claims. (Cl. 320—5)

Our invention relates to regulating systems for storage batteries and particularly to systems for regulating the charging current and the discharging current of a storage battery which is employed as a standby power source.

In many electrical installations, it is very essential that there be provided a secondary or standby source of power which is at all times ready to supply power to a load circuit in case the main source of supply for the load circuit fails. It is quite common where the power is direct current to provide a standby storage battery which is normally arranged to be charged from the main source as long as the main power source is operative to supply power to the load circuit and which is arranged to supply power immediately to the load circuit in case the main power source fails. This result is usually accomplished by providing a direct current dynamoelectric machine in series with the battery and regulating the excitation of this series connected machine so as to maintain the proper charging voltage across the battery while it is being charged from the main power source and so as to maintain the proper voltage across the load circuit when it is being supplied from the battery.

One object of our invention is to provide an improved regulating system for such a series connected dynamoelectric machine, between a battery and a load circuit, which is fast and accurate in operation, has no contact mechanisms or sensitively balanced armatures, and is free from excessive maintenance.

Our invention will be better understood from the following description when taken in connection with the accompanying drawing, the single figure of which diagrammatically illustrates a standby storage battery regulating system embodying our invention, and the scope of our invention will be pointed out in the appended claims.

In the accompanying drawing, I represents a direct current load circuit which is arranged to be supplied normally with electric energy at a constant voltage from a primary source of direct current 2, shown as a direct current power circuit which is arranged to be connected across the load circuit I by means of a suitable switch 3. As shown, this switch 3 is arranged to connect the positive sides of the circuits I and 2 together, it being assumed that the negative sides of the two circuits are permanently connected together. A suitable standby storage battery 4 is also arranged to be connected across the load circuit I by means of a manually controlled line switch BLS, which is connected between the positive terminal of the battery 4 and the positive side of the load circuit I. The negative terminal of the battery 4 is shown as being permanently connected to the negative side of the load circuit I. The flow of current between the battery 4 and the load circuit I is controlled by means of a direct current dynamoelectric machine 5, the armature winding of which is connected between the positive terminal of the battery 4 and the positive side of the load circuit I. As shown, the direct current machine 5 is driven by a shunt wound direct current motor 6, which is arranged to be connected across the load circuit I by means of a suitable switch 7 and a conventional starter, not shown, whereby the motor may be started from rest and brought up to its normal operating speed.

The switch 3 is normally arranged to be closed when an associated manually controlled switch 8 is closed and the voltage of the primary source 2 is within a predetermined range and is arranged to be opened when either the associated control switch 8 is open or the voltage of the primary source 2 decreases to such a low value that current flows from the battery 4 to the primary source 2. As shown, the switch 3 is provided with an operating winding 10 which is arranged to be connected across the primary supply circuit 2 by means of a circuit that includes in series the contacts 11 of the control switch 8 when it is closed, the contacts 12 of a normal voltage relay NVR which is connected across the supply circuit 2 so as to close the contacts 12 when the supply circuit voltage is slightly below its normal operating voltage, the contacts 13 of an overvoltage relay OVR which is connected across the supply circuit 2 so as to open the contacts 13 when the supply circuit voltage is in excess of the maximum voltage allowable at the closing of the switch 3, and the contacts 14 of a line relay LR which is arranged to be energized from the supply circuit 2 when the control switch 8 is closed, the supply circuit voltage is within the proper operating range, and no current is flowing from the battery 4 to the supply circuit 2. The energizing circuit of the line relay LR includes the contacts 15 of a suitable reverse current relay RC, which is arranged in any suitable manner so that it opens its contacts 15 when current flows from the battery 4 to the supply circuit 2. As shown in the drawing, the reverse current relay RC is provided with a current winding 16, which is connected between the positive terminals of the supply circuit 2 and the battery 4 when the switch 3 is closed, and with a voltage winding 17, which is arranged to be connected across the supply circuit 2 by the contacts 18 of a control relay CR, the operating winding of which is connected across the supply circuit 2 by the contacts 19 of the switch 3 when it is closed.

For controlling the direction and magnitude of the voltage of the direct current machine 5 so as to vary the flow of current to and from the battery 4 in the desired manner, we provide, in accordance with our invention, a direct current exciter 20 of the well-known armature reaction excited type, commonly known as an amplidyne exciter, which has its output brushes connected to the field winding 21 of the direct current machine 5. The exciter 20 may be driven by any suitable constant speed driving means, such as the shunt motor 6, and is provided with the usual series compensating field windings 22 and 23 and the anti-hunt shunt field winding AHF, which has a suitable condenser 24 connected in the circuit thereof.

When the primary source 2 is supplying current to the load circuit 1, it is desirable to charge the battery 4 from the supply circuit 2 so as to maintain the battery fully charged and to control the charging current in accordance with the condition of the battery. In the embodiment of the invention shown in the drawing, we accomplish this result by providing the exciter 20 with a voltage regulating field winding VRF which, when the control relay CR is energized, is energized so that the charging voltage is equal to the sum of the voltage of the machine 5 and the supply circuit 2. When the control relay CR is energized, one terminal of the voltage regulating field winding VRF is connected by means of the contacts 26 of the relay CR to the positive side of the load circuit 1, and the other terminal of the voltage regulating field winding VRF is connected by means of the contacts 27 of the relay CR to an adjustable contact 28 on a resistor RHVR, which is connected in series with the resistors 29 and 30 across the terminals of a constant voltage direct current generator 31 driven by the motor 6. The series connected resistors RHVR, 29 and 30 are so arranged that one terminal of the resistor RHVR is connected to the positive terminal of the constant voltage generator 31 and one terminal of the resistor 30 is connected to the negative terminal of the generator 31, and the resistor 29 is connected between the other terminals of the resistors RHVR and 30. Also, the common connection 32 between the resistors 29 and 30 is connected to the negative side of the load circuit 1 and the battery 4 so that the magnitude and direction of the current through the field winding VRF, when the control relay CR is energized, depends upon the difference between the load circuit voltage and voltage drop between the adjustable contact 28 on the resistor RHVR and the common connection 32 which is connected to the negative side of the load circuit 1 and the battery 4. The contact 28 on the resistor RHVR is so adjusted that with the supply circuit 2 maintaining normal voltage across the load circuit 1, the load circuit voltage exceeds the voltage drop between the adjustable contact 28 and the negative side of the load circuit 2 a sufficient amount so that the current through the regulating field winding VRF produces an exciting flux in the proper direction, indicated by the solid arrow associated therewith, and of proper magnitude to cause the exciter 20 to excite the field winding 21 of the machine 5 in such a manner that the machine 5 generates its maximum voltage and the charging voltage impressed across the battery 4 is equal to the sum of the supply circuit voltage and the voltage of the machine 5.

While we have shown separate resistors RHVR, 29 and 30, it is obvious that they could be a single resistor having a plurality of terminals and adjustable contacts associated therewith. Therefore, in the appended claims the term "resistor" is employed to cover either a single resistor or a plurality of separate resistors connected in series.

The control of the charging rate is effected by means of a current limiting field winding CLF, on the exciter 20, which is energized in accordance with the difference between a predetermined constant voltage and a voltage that varies with the magnitude of the charging current. For accomplishing this result in the arrangement shown in the drawing, we provide a resistor 33 in the connection between the negative terminal of the battery 4 and the point where the common connection 32 is connected to the negative side of the load circuit 1. One terminal of the current limiting field winding CLF is connected to the negative terminal of the battery 4, and the other terminal of the current limiting field winding CLF is connected to an adjustable contact 34 on the resistor 29 through a suitable unidirectional conducting device, such as a half-wave rectifier 35, which allows current to flow only from the current limiting field winding to the adjustable contact 34. The contact 34 on the resistor 29 is so adjusted that when the maximum desired charging current is flowing to the battery, the voltage drop across the resistor 33 exceeds the voltage drop between the common connection 32 and the adjustable contact 34 so that the terminal of the resistor 33 which is connected to the negative terminal of the battery 4 is more positive than the adjustable contact 34 on the resistor 29. Current then flows through the current limiting field winding CLF and the rectifier 35 in such a direction as to produce a flux in the direction indicated by the solid arrow associated with the winding CLF so that the net excitation produced by the two field windings VRF and CLF is decreased to effect a decrease in the voltage generated by the machine 5 and the charging voltage impressed across the battery 4.

In order to limit to a predetermined maximum value the charging voltage that can be applied across the battery 4, we provide the exciter 20 with a voltage limiting field winding VLF which is arranged to be energized so as to decrease the net excitation of exciter 20 when the charging voltage exceeds a predetermined value. This result is accomplished in the embodiment shown in the drawing by connecting one terminal of the voltage limiting field winding VLF to the positive terminal of the constant voltage generator 31 and the other terminal of the voltage limiting field winding VLF to an adjustable contact 37 on a resistor RHV, which is permanently connected in series with the armature winding of the machine 5 across the load circuit 1, and therefore is connected across the terminals of the battery 4 when the switch BLS is closed. A suitable unidirectional current conducting device, such as a one-wave rectifier 38, is connected in the circuit of the winding VLF so that current can flow through the voltage limiting field winding VLF only when the voltage across the resistor RHV is of such a magnitude that the voltage at the contact 37 is higher than the voltage at the positive terminal of the source 31. The contact 37 is so adjusted on the resistor RHV that when the charging voltage reaches a predetermined maximum value the voltage between the contact 37 and the negative terminal of the battery 4 is just equal to the sum of the voltage drops across the resistors RHVR, 29 and 33 so that if the charging voltage tends to exceed this predetermined value, current flows through the voltage limiting winding VLF in a direction to produce a flux in the direction indicated by the solid arrow associated therewith so as to decrease the net excitation of the exciter 20 and consequently the voltage of the machine 5, which in turn decreases the charging voltage and the charging current.

When the main supply circuit 2 fails and the battery 4 has to supply all of the current to the load circuit 1, it is desirable to effect the changeover quickly without any material change occurring in the normal operating voltage across the load circuit 1 and to continue to supply current to the load circuit 1 from the battery 4 as long as any charge remains in the battery, even though the discharge voltage of the battery may decrease below the load circuit voltage. In order to accomplish this result, the control relay CR, when deenergized changes the connections of the voltage regulating field winding VRF so that it is energized in accordance with the variations in the load circuit voltage relative to the voltage of the constant voltage generator 31. In the embodiment of the invention shown in the drawing, one terminal of the voltage regulating field winding VRF is connected to the positive terminal of the generator 31 by the contacts 38 of the control relay CR when it is deenergized, and the other terminal of the voltage regulating field winding VRF is connected by the contacts 40 of the control relay CR when it is deenergized to an adjustable contact 41 on a resistor RHCL, which is connected across the load circuit 1. The contact 41 on the resistor RHCL is so adjusted that when only the battery 4 is supplying current to the load circuit 1 and the battery discharging voltage is substantially equal to the normal load circuit voltage, the voltage between the contact 41 and the negative side of the load circuit is substantially equal to the sum of the voltage drops across the resistors RHVR and 29 so that no current flows through the field winding VRF. Therefore, when the charge of the battery 4 is such that its discharging voltage is higher than the normal load circuit voltage, the load circuit voltage is maintained at a voltage slightly higher than normal so that the voltage between the contact 41 and the negative side of the load circuit 1 is also slightly higher than the sum of the voltage drops across the resistors RHVR and 29. Since the contact 41 is at a higher potential than the positive terminal of the generator 31 under such conditions of the battery 1, current flows through the voltage regulating field winding VRF in a direction to produce in the exciter 20 an exciting flux in the direction indicated by the solid arrow associated therewith so that the voltage generated by the dynamoelectric machine 5 opposes the battery voltage and tends to decrease the load circuit voltage. Consequently, the higher the discharging voltage of the battery 4 is above the normal load circuit voltage, the greater is the opposing voltage of the machine 5 so that the load circuit voltage is maintained substantially constant for all discharging voltages of the battery 4 in excess of the load circuit voltage.

When the discharging voltage of the battery 4 is below the normal line voltage, the regulating arrangement maintains a load circuit voltage which is slightly lower than the normal operating load circuit voltage so that current flows through the voltage regulating field winding VRF from the positive terminal of the resistor RHVR to the point 41 and produces an exciting flux in the opposite direction to that indicated by the solid arrow associated therewith. Consequently, the direction of the voltage of the machine 5 is such that it is added to the battery voltage and its magnitude is regulated to maintain the load circuit voltage at substantially its normal operating value. Therefore, it will be seen that when the battery 4 is supplying current to the load circuit and the battery voltage decreases from a value above the load circuit voltage to a value below the load circuit voltage, the regulating arrangement varies the excitation of the exciter 20 and the machine 5 so that the voltage of each of these machines is gradually decreased from a value in one direction to zero and then is gradually increased in the opposite direction.

In order to prevent the current output of the battery 4 from exceeding a predetermined value when it is supplying current to the load circuit, the terminal of the current limiting field winding CLF, which is connected to the adjustable contact 34 on the resistor 29 through the half-wave rectifier 35, is also connected to an adjustable contact 43 on the resistor 30 through a suitable unidirectional conducting device, such as a half-wave rectifier 44, which is so arranged as to allow current to flow through the current limiting field winding CLF only when sufficient current is supplied by the battery 4 to cause the voltage drop across the resistor 33 to be greater than the voltage drop between the common connection 32 and the adjustable contact 43 on the resistor 30. Therefore, when current from the battery 4 to the load circuit 1 exceeds a predetermined value, which depends upon the position of the adjustable contact 43, current flows through the field winding CLF to produce a flux in the opposite direction to that indicated by the solid arrow associated therewith, so as to increase the excitation of exciter 20 and the opposing voltage of the machine 5 when the battery voltage exceeds the load circuit voltage and to decrease the excitation of the exciter 20 and the boosting voltage of the machine 5 when the battery voltage is below the load circuit voltage.

The operation of the regulating arrangement shown in the drawing is as follows: When it is desired to place the regulating arrangement in operation, the control switch is closed to complete across the supply circuit 2 an energizing circuit for the line relay LR through the contacts 11 of the control switch 8, the contacts 12 of the normal voltage relay NVR, the contacts 13 of the overvoltage relay OVR, and the contacts 15 of the reverse current relay RC. Therefore, if the supply circuit voltage is within a predetermined range, the line relay LR is energized and closes its contacts 14 to complete across the supply circuit 2 an energizing circuit for the operating winding 10 of the switch 3 through the previously described series connected contacts 11, 12 and 13. The closing of the main contacts of the switch 3 connects the positive side of the supply circuit 2 to the positive side of the load circuit 1, and the closing of the auxiliary contacts 19 of the switch 3 completes across the supply circuit 2 an energizing circuit for the control relay CR through the series connected contacts 11, 12, 13 and 14. The closing of the contacts 18 of the control relay CR connects the voltage winding 17 of the reverse current relay RC across the supply circuit 2, but the contacts 15 of the relay RC remain closed because the current flow through the current winding 16 is from the supply circuit 2 to the load circuit 1.

The motor 6 is then started by closing the switch 7, and after the motor 6 has reached its normal operating speed, the voltage regulating winding VRF is energized in accordance with the difference between the load circuit voltage and the voltage drop across the resistors RHVR and 29. The voltage of the constant voltage machine 31 is adjusted so that the voltage drop across the resistors RHVR and 29 is less than the load circuit voltage so that the current through the field winding VRF is in a direction to produce a flux in the direction indicated by the associated arrow. This flux causes the voltage of the machine 5 to be in such a direction that it is added to the voltage of the supply circuit 2 and the voltage impressed across the resistor RHV is equal to the sum of the voltages of the machine 5 and the supply circuit 2. The voltage of the machine 5 is limited by the position of the adjustable contact 37 on the resistor RHV because as soon as the voltage between the contact 37 and the negative side of the supply circuit 2 exceeds the voltage drop across the resistors RHVR, 29 and 33, current flows through the voltage limiting field winding VLF in a direction to produce a flux in the direction indicated by the associated arrow which decreases the net excitation of the exciter 20 and the voltage of the machine 5 so as to decrease the voltage impressed across the resistor RHV.

The position of the adjustable contact 37 is then varied to cause the voltage across the resistor RHV to be the same as the terminal voltage of the disconnected battery 4, and then the battery line switch BLS is closed, after which the adjustable contact 37 is so positioned that no current flows through the voltage limiting field winding VLF until the charging voltage across the battery 4 reaches a predetermined value.

It will be noted that the charging current produces across the resistor 33 a voltage drop which is in such a direction that when the charging current exceeds a predetermined maximum value, current flows through the current limiting field winding CLF and the half-wave rectifier 35 in a direction to produce a flux in the direction indicated by the associated arrow so as to decrease the net excitation produced by the exciter field windings VRF and CLF and thereby decrease the voltage of the dynamoelectric machine 5 sufficiently to prevent the charging current from exceeding the predetermined maximum value. The current that flows through the current limiting field winding CLF also flows through that portion of the resistor 29 between the adjustable contact 34 and the common connection 32 in such a direction as to effect an increase in the voltage drop across this portion of the circuit connected to the constant voltage generator 31 and, consequently, an increase in the voltage drop across the resistors RHVR and 29. Therefore, the voltage impressed across the voltage regulating winding VRF and the current therethrough are also reduced to decrease the charging voltage when the charging current exceeds the predetermined maximum value.

The position to which the adjustable contact 37 is moved is such that when the battery 4 is fully charged the voltage between the adjustable contact 37 and the common connection 32 is sufficiently high to cause enough current to flow through the voltage limiting field winding VLF to reduce the excitation of the exciter 20 and the voltage of the dynamoelectric machine 5 to such a value that the charging current is decreased to a predetermined small value. Since this small charging current flows through the resistor 33 in such a direction that an increase in the charging current increases the drop between the adjustable contact 37 and the common connection 32, and thereby effects an increase in the excitation of the opposing voltage limiting field winding VLF and a decrease in the net excitation of the exciter 20 and in the voltage of the dynamoelectric machine 5, and a decrease in this small charging current decreases the excitation of the opposing voltage limiting field winding VLF, and thereby effects an increase in the net excitation of the exciter 20 and in the voltage of the dynamoelectric machine 5, the regulating arrangement maintains the small charging current substantially constant at a predetermined value dependent upon the position of the adjustable contact 37.

Let it now be assumed that while the battery 4 is being charged, the main supply circuit voltage fails, so that the load circuit 1 is supplied from the battery 4 and current also flows from the battery 4 to the supply circuit 2 through the current winding 16 of the reverse current relay RC so that the contacts 15 of this relay are opened to effect the deenergization of the line relay LR. The opening of the contacts 14 of the relay LR effects the deenergization of the line switch 3 and the control relay CR so that the supply circuit 2 is disconnected from the load circuit 1 and the battery 4 and so that the connections of the voltage regulating field winding VRF of the exciter 20 are changed to cause this field winding to be energized in accordance with variations in the load circuit voltage.

The position of the adjustable contact 41 on the resistor RHCL is such that when the battery 4 is fully charged the voltage drop across the resistors RHVR and 29 is less than the voltage drop between the adjustable contact 41 and the common connection 32 so that current flows from the adjustable contact 41 through the voltage regulating field winding VRF to the positive terminal of the resistor RHVR. This current is in a direction to excite the exciter 20 in such a manner that the voltage of the dynamoelectric machine 5 opposes the terminal voltage of the battery 4. The position of the contact 41 on the resistor RHCL is such that when the battery is fully charged and a predetermined voltage exists across the load circuit 1, sufficient current flows through the voltage regulating field winding VRF to cause the dynamoelectric machine 5 to generate the proper opposing voltage to maintain the load circuit voltage at the predetermined value. As the battery 4 becomes discharged and its terminal voltage decreases, the load circuit voltage tends to decrease so as to decrease the voltage drop between the adjustable contact 41 and the common connection 32 thereby causing less current to flow through the voltage regulating winding VRF, which in turn causes the dynamoelectric machine 5 to generate less opposing voltage and thereby tend to maintain the load circuit voltage at the desired value.

When the battery voltage reaches a predetermined discharge value, the voltage drop between the adjustable contact 41 and the common connection 32 is just equal to the voltage drop across the resistors RHVR and 29 so that no current flows through the exciter voltage regulating field winding VRF and the dynamoelectric machine 5 generates no opposing voltage. If the battery voltage decreases below this predetermined discharge value, the voltage drop between the adjustable contact 41 and the common connection 32 decreases below the voltage drop across the resistors RHVR and 29 so that the current now flows in the opposite direction through the exciter voltage regulating field winding VRF to reverse the polarities of the exciter 20 and the dynamoelectric machine 5 and thereby cause the voltage of the dynamoelectric machine 5 to boost the battery voltage an amount dependent upon the battery voltage.

While the battery 4 is supplying current to the load circuit 1, the output current from the battery 4 is prevented from exceeding a predetermined value by the flow of current through the current limiting field winding CLF. When the battery discharging current tends to exceed this predetermined value, the voltage drop across the resistor 33 exceeds the voltage drop between the common connection 32 and the adjustable contact 43 so that current flows through the half-wave rectifier 44 and the field winding CLF in such a direction as to increase the excitation of the exciter 20 and of the dynamoelectric machine 5 if the voltage regulating field winding VRF is so energized that the voltage of the machine 5 is opposing the battery voltage and so as to decrease the excitation of the exciter 20 and of the dynamoelectric machine 5 if the voltage regulating field winding VRF is so energized that the voltage of the machine 5 is in the same direction as the battery voltage. The current that flows through the current limiting field winding CLF also flows through the portion of the resistor 30 between the common connection 32 and the adjustable contact 43 in such a direction as to effect an increase in the voltage drop across this portion of the circuit connected to the constant voltage generator 31 and a decrease in the voltage drop across the resistors RHVR and 29. Consequently, when the output current of the battery 4 exceeds a predetermined value, the excitation of the voltage regulating field winding VLF is also varied to control the voltage of the machine 5 in the proper manner to decrease the current output irrespectively of the polarity of the machine 5.

If, while the battery 4 is supplying the load circuit 1, voltage is restored to normal across the main supply circuit 2 so that the contacts 12 of the normal voltage relay NVR are closed, the line relay LR is energized to effect the closure of the line switch 3 in the manner heretofore described so that the regulating arrangement functions to control the recharging of the battery 4.

While we have, in accordance with the patent statutes, shown and described our invention as applied to a particular system and as embodying various devices diagrammatically indicated, changes and modifications will be obvious to those skilled in the art, and we, therefore, aim in the appended claims to cover all such changes and modifications as fall within the true spirit and scope of our invention.

What we claim as new and desire to secure by Letters Patent of the United States is:

1. In a battery charging system, comprising a battery, a direct current supply circuit, and a dynamoelectric machine connected between said supply circuit and battery, a regulating arrangement for controlling the excitation of said machine comprising an exciter for said machine having a field winding, means for energizing said exciter in response to variations in the load circuit voltage, a constant voltage source, a resistor connected in a circuit across said source and having a point thereof connected to one side of said battery, a unidirectional current conducting device, a second resistor connected across said battery, and an opposing field winding on said exciter connected in series with said unidirectional current conducting device between points on said resistors whereby current flows through said opposing field winding only when the voltage across said second resistor exceeds a predetermined value.

2. In a battery charging system, comprising a battery, a direct current supply circuit, and a dynamoelectric machine connected between said supply circuit and battery, a regulating arrangement for controlling the excitation of said machine comprising an exciter for said machine having a field winding, means for energizing said exciter in response to variations in the load circuit voltage, a direct current source having a constant potential, a resistor, a circuit including said resistor connected across said source, a connection between said last mentioned circuit and one side of said battery, a second resistor connected across said battery, a unidirectional current conducting device, and an opposing field winding on said exciter connected in series with said unidirectional current conducting device between points on said resistors whereby current flows through said opposing field winding only when the voltage across said resistor exceeds a predetermined value.

3. In a battery charging system, comprising a battery, a direct current supply circuit, and a dynamoelectric machine connected between said supply circuit and battery, a regulating arrangement for controlling the excitation of said machine comprising an exciter for said machine having a field winding, means for energizing said exciter in response to variations in the load circuit voltage, a resistor connected across said battery, a second resistor connected in series with said supply circuit and said battery, an opposing field winding on said exciter, and means for energizing said opposing field winding only when charging current is being supplied to said battery and the sum of the voltage drops across said resistors exceeds a predetermined value.

4. In a battery charging system, comprising a battery, a direct current supply circuit, and a dynamoelectric machine connected between said supply circuit and battery, a regulating arrangement for controlling the excitation of said machine comprising an exciter for said machine having a field winding, means for energizing said exciter in response to variations in the load circuit voltage, a constant voltage source, a resistor connected across said battery, a second resistor connected in series with said supply circuit and said battery, an opposing field winding on said exciter, and means for energizing said opposing field winding in response to a predetermined relationship between the voltage of said constant voltage source and the sum of the voltage drops across said resistors.

5. In a battery charging system, comprising a battery, a direct current supply circuit, and a dynamo-electric machine connected between said supply circuit and battery, a regulating arrangement for controlling the excitation of said machine comprising an exciter for said machine having a field winding, means for energizing said exciter in response to variations in the load circuit voltage, a direct current source having a constant potential, a resistor, a circuit including said resistor connected across said source, a second resistor connected across said battery, a third resistor connected in series with said supply circuit and said battery, a common connection between said first and third resistors, a unidirectional current conducting device, and an opposing field winding on said exciter connected in series with said unidirectional current conducting device between points on said first and third resistors whereby current flows through said opposing field winding only when the charging current is being supplied to said battery and the voltage drop between said common connection and the point on said second resistor to which said opposing field winding is connected exceeds the voltage drop between said common connection and the point on said first resistor to which said opposing field winding is connected.

6. In a direct current system comprising a load circuit, a primary source connected across said load circuit, and a dynamoelectric machine connected between said load circuit and said battery, a regulating arrangement for controlling the excitation of said machine comprising an exciter for said machine having a field winding, means for energizing said field winding in response to variations in the load circuit voltage, a direct current source having a constant voltage, a resistor, a circuit including said resistor connected across said constant voltage source, a second resistor connected in series with said battery and load circuit, a unidirectional current conducting device, a second field winding on said exciter connected in series with said unidirectional current conducting device between predetermined points on said resistors, and another electric connection between said resistors whereby current flows through said second field winding only in response to the current through said second resistor exceeding a predetermined value in a predetermined direction.

7. In a direct current system comprising a load circuit, a primary source connected across said load circuit, and a dynamoelectric machine connected between said load circuit and said battery, a regulating arrangement for controlling the excitation of said machine comprising an exciter for said machine having a field winding, means for energizing said field winding in response to variations in the load circuit voltage, a direct current source having a constant voltage, a resistor, a circuit including said resistor connected across said constant voltage source, a second resistor connected in series with said battery and load circuit, a unidirectional current conducting device, a second field winding on said exciter connected in series with said unidirectional current conducting device between predetermined points on said resistors, and another electric connection between said resistors whereby the voltage drop across said second resistor is in the proper direction and of the proper magnitude to cause current to flow through said second field winding in a direction to decrease the net excitation of said exciter only when the charging current to said battery exceeds a predetermined value.

8. In a direct current system comprising a load circuit, a primary source connected across said load circuit, and a dynamoelectric machine connected between said load circuit and said battery, a regulating arrangement for controlling the excitation of said machine comprising an exciter for said machine having a field winding, means for energizing said field winding in response to variations in the load circuit voltage, a direct current source having a constant voltage, a resistor, a circuit including said resistor connected across said constant voltage source, a second resistor connected in series with said battery and load circuit, a unidirectional current conducting device, a second field winding on said exciter connected in series with said unidirectional current conducting device between predetermined points on said resistors, and another electric connection between said resistors whereby the voltage drop across said second resistor is in the proper direction and of the proper magnitude to cause current to flow through said second field winding in a predetermined direction only when the discharging current from said battery exceeds a predetermined value.

9. In a direct current system comprising a load circuit, a primary source connected across said load circuit, and a dynamoelectric machine connected between said load circuit and said battery, a regulating arrangement for controlling the excitation of said machine comprising an exciter for said machine, a direct current source having a constant voltage, a resistor, a circuit including said resistor connected across said constant voltage source, a second resistor connected across said load circuit, a field winding for said exciter connected between predetermined points of said resistor, and an electric connection between said first mentioned resistor and said load circuit whereby the current through said field winding depends upon the variations in the load circuit voltage relative to the voltage drop across said first mentioned resistor.

10. In a direct current system comprising a load circuit, a primary source connected across said load circuit, and a dynamoelectric machine connected between said load circuit and said battery, a regulating arrangement for controlling the excitation of said machine comprising an exciter for said machine, a direct current source having a constant voltage, a resistor, a circuit including said resistor connected across said constant voltage source, a second resistor connected across said load circuit, a field winding for said exciter connected between predetermined points of said resistor, an electric connection between said first mentioned resistor and said load circuit whereby the current through said field winding depends upon the variations in the load circuit voltage relative to the voltage drop across said first mentioned resistor, a third resistor connected in series with said battery and load circuit, a unidirectional current conducting device, and a second field winding for said exciter connected in series with said unidirectional current conducting device between predetermined points on said resistors whereby current flows through said second winding only in response to the current through said third resistor exceeding a predetermined value in a predetermined direction.

11. In a direct current system comprising a load circuit, a primary source connected across said load circuit, and a dynamoelectric machine connected between said load circuit and said battery, a regulating arrangement for controlling the excitation of said machine comprising an exciter for said machine, a direct current source having a constant voltage, a resistor, a circuit including said resistor connected across said constant voltage source, a second resistor connected across said load circuit, a field winding for said exciter connected between predetermined points of said resistor, an electric connection between said first mentioned resistor and said load circuit whereby the current through said field winding depends upon the variations in the load circuit voltage relative to the voltage drop across said first mentioned resistor, a third resistor connected in series with said battery and load circuit, a unidirectional current conducting device, and a second field winding for said exciter connected in series with said unidirectional current conducting device between predetermined points on said resistors whereby the voltage drop across said second resistor is in the proper direction and of the proper magnitude to cause current to flow through said field winding and a portion of said first resistor in a direction to decrease the net excitation of said exciter only when the charging current to said battery exceeds a predetermined value.

12. In a direct current system comprising a load circuit, a primary source connected across said load circuit, and a dynamoelectric machine connected between said load circuit and said battery, a regulating arrangement for controlling the excitation of said machine comprising an exciter for said machine, a direct current source having a constant voltage, a resistor, a circuit including said resistor connected across said constant voltage source, a second resistor connected across said load circuit, a field winding for said exciter connected between predetermined points of said resistor, an electric connection between said first mentioned resistor and said load circuit whereby the current through said field winding depends upon the variations in the load circuit voltage relative to the voltage drop across said first mentioned resistor, a third resistor connected in series with said battery and load circuit, a unidirectional current conducting device, and a second field winding for said exciter connected in series with said unidirectional current conducting device between predetermined points on said resistors whereby the voltage drop across said second resistor is in the proper direction and of the proper magnitude to cause current to flow through said field winding and a portion of said first resistor in a direction to charge the excitation of said exciter in the proper manner to decrease the battery output only when the discharging current from said battery exceeds a predetermined value.

13. In a direct current system comprising a load circuit, a primary source of current connected to said circuit, a storage battery connected across said load circuit, and a dynamoelectric machine connected between said load circuit and said battery, a regulating arrangement for controlling the excitation of said machine comprising an exciter for said machine having a field winding, means for disconnecting said primary source from said load circuit in response to the flow of current from said battery to said primary source, a direct current source having a constant voltage, a resistor, a circuit including said resistor connected across said constant voltage source, a second resistor connected across said load circuit, a field winding for said exciter, means controlled by said disconnecting means for connecting said field winding between two predetermined points on said resistors when said primary source is connected to said load circuit and between two other predetermined points on said resistors when said primary source is disconnected from said load circuit, and an electric connection between said first resistor and said load circuit whereby the current through said field winding depends upon variations in the load circuit voltage relative to the voltage drop across said first resistor.

14. In a direct current system comprising a load circuit, a primary source of current connected to said circuit, a storage battery connected across said load circuit, and a dynamoelectric machine connected between said load circuit and said battery, a regulating arrangement for controlling the excitation of said machine comprising an exciter for said machine having a field winding, means for disconnecting said primary source from said load circuit in response to the flow of current from said battery to said primary source, a direct current source having a constant voltage, a resistor, a circuit including said resistor connected across said constant voltage source, a second resistor connected across said load circuit, a field winding for said exciter, an adjustable contact on each resistor, means controlled by said disconnecting means for connecting said field winding between said adjustable contact on said first resistor and a predetermined fixed terminal of said second resistor when said primary source is connected to said load circuit and between said adjustable contact on said second resistor and a predetermined fixed terminal of said first resistor when said primary source is disconnected from said load circuit, and an electric connection between said first resistor and said load circuit whereby the current through said field winding depends upon variations in the load circuit voltage relative to the voltage drop across said first resistor.

BURR S. WEAVER.
DONALD E. GARR.